(12) United States Patent
Fliege et al.

(10) Patent No.: US 6,502,890 B1
(45) Date of Patent: Jan. 7, 2003

(54) SIDE-RAIL COUPLING FOR TARPAULIN COVERS OF VEHICLE SUPERSTRUCTURES

(75) Inventors: Dieter Fliege, Remscheid (DE); Josef Drasch, Winzer (DE); Roger Remmel, Remscheid (DE)

(73) Assignee: Edscha LKW-Schiebeverdecke GmbH, Remscheid (DE)

( * ) Notice: Subject to any disclaimer, the term of this patent is extended or adjusted under 35 U.S.C. 154(b) by 0 days.

(21) Appl. No.: 09/786,081

(22) PCT Filed: Sep. 1, 1999

(86) PCT No.: PCT/DE99/02826

§ 371 (c)(1),
(2), (4) Date: Jun. 14, 2001

(87) PCT Pub. No.: WO00/12340

PCT Pub. Date: Mar. 9, 2000

(30) Foreign Application Priority Data

Sep. 1, 1998 (DE) .......................................... 198 39 819

(51) Int. Cl.[7] ................................................. B60P 7/02
(52) U.S. Cl. .................................. 296/100.12; 296/105
(58) Field of Search ...................... 296/100.11, 100.12, 296/100.17, 104, 105

(56) References Cited

U.S. PATENT DOCUMENTS

| | | | | |
|---|---|---|---|---|
| 3,556,569 | A | | 1/1971 | Bruhn .......................... 287/54 |
| 3,894,598 | A | | 7/1975 | Yeou .......................... 180/9.48 |
| 5,829,823 | A | * | 11/1998 | Swenson .................... 296/183 |
| 5,924,759 | A | * | 7/1999 | DeMonte et al. ........... 296/105 |

FOREIGN PATENT DOCUMENTS

| | | | | |
|---|---|---|---|---|
| DE | 35 41 812 | | * 3/1987 | |
| DE | 9403053 | | 7/1994 | ............. F16B/7/14 |
| GB | 2 099 913 | | * 12/1982 | |

* cited by examiner

*Primary Examiner*—Joseph D. Pape
(74) *Attorney, Agent, or Firm*—Davidson, Davidson & Kappel, LLC

(57) ABSTRACT

The invention relates to a side-rail coupling for tarpaulin covers of vehicle superstructures, notably a coupling for the upper side-rails of cover frames which can be assembled and comprise separable longitudinal sections of running or guide rails for a telescopic tarpaulin cover. The side-rails (3) have at least one hollow profile chamber and running or guide rails connected to same and serve to support and guide rollers or roller bogies (4) on which hoops (5) carrying the tarpaulin are supported laterally against the cover frame. Adjacent longitudinal sections of the side rails (3) can be removably coupled using coupling elements which engage the hollow profile chamber in a positive fit. To improve handling, reduce weight and increase operating safety the invention provides for the coupling elements to be embodied by profiled material sections whose cross-sectional shape is substantially congruent with the inside cross section of the hollow profile chamber and are fitted with at least one bolt element for each of the longitudinal side rail (3) sections to be coupled together. The bolt elements can be moved against a spring force into a position perpendicular to the longitudinal axis of the longitudinal sections and cooperate with a complementary recess configured in the walls of the hollow profile chambers of the longitudinal side rail (3) sections to be coupled.

7 Claims, 3 Drawing Sheets

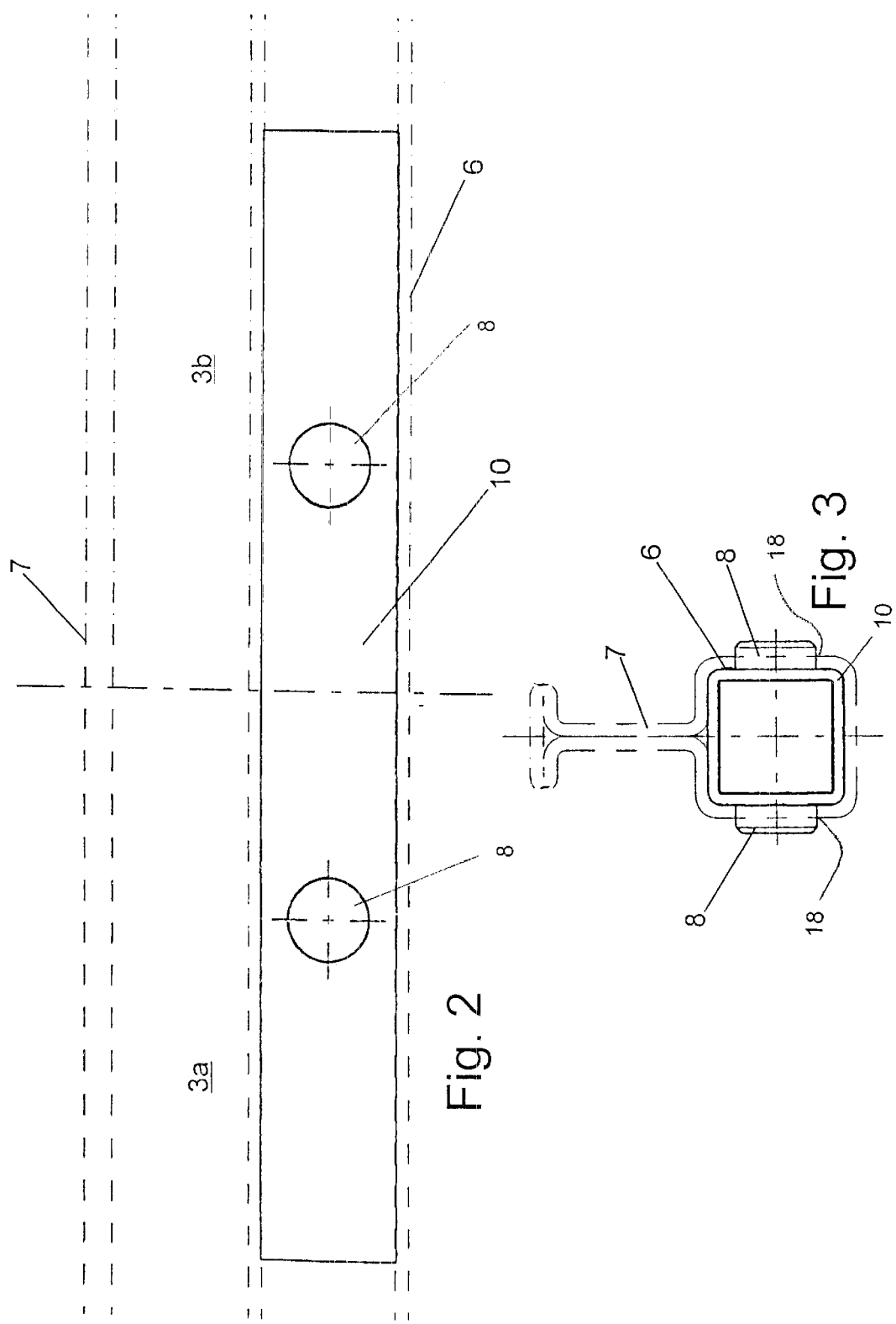

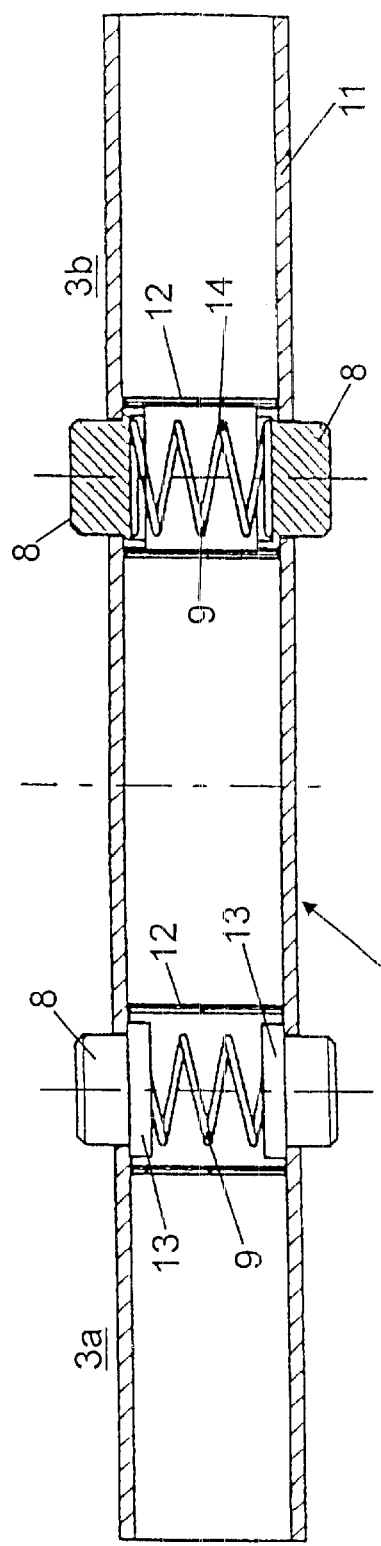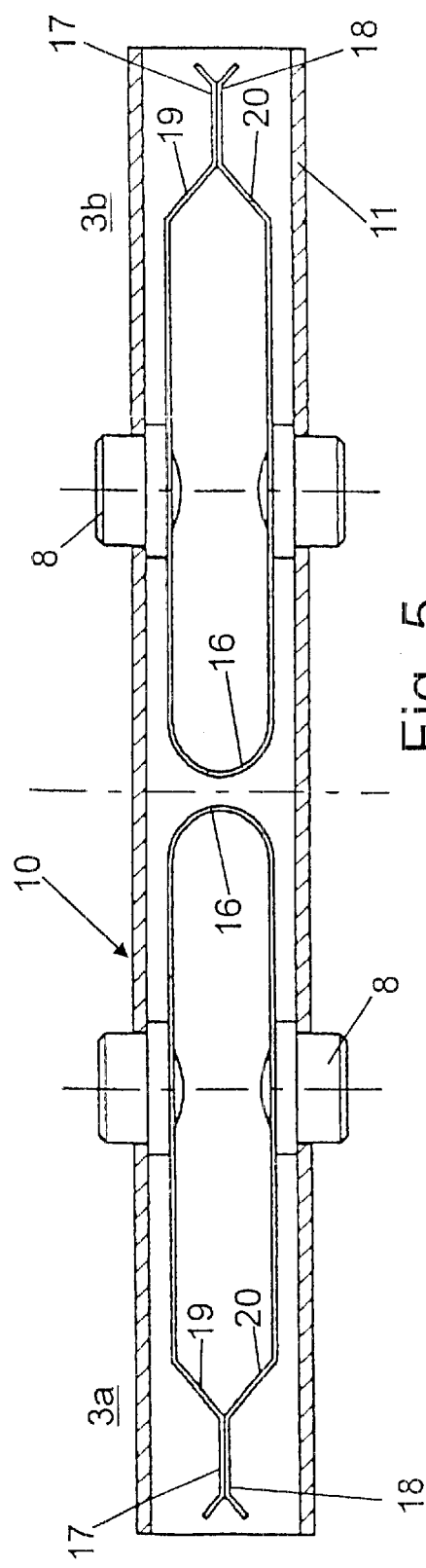

SIDE-RAIL COUPLING FOR TARPAULIN COVERS OF VEHICLE SUPERSTRUCTURES

BACKGROUND OF THE INVENTION

The present invention relates to a side-rail coupling for tarpaulin canopies of vehicle superstructures, in particular a coupling for length sections, which can be put together and separated, of upper side rails of canopy frames, which side rails have running and guide rails for a tarpaulin canopy which can be pushed together, the side rails having at least one hollow profile chamber and, connected to the latter, the running and guide rails serving for the supporting and guiding of rollers or roller carriages, which support bows carrying the roof tarpaulin, in a displaceable manner against the canopy frame, and adjacent length sections of side rails being connectable releasably to each other by means of coupling elements engaging in a form-locking manner in the hollow profile chamber of said side rails.

In the case of vehicles which are fitted with a tarpaulin canopy which is supported against the loading surface or the vehicle chassis by means of a canopy frame and can preferably be pushed together, in many cases there arises the necessity of being able to remove part of the canopy linkage in order to facilitate, or indeed to make possible, loading from above, or for loading with bulky goods. The parts of a canopy linkage which are to be removed for the above mentioned purposes are mainly length sections of the upper side rails thereof, which length sections have to be removed over a part of the length of the canopy frame in order to carry out a loading or unloading operation smoothly, and then have to be reinserted into the canopy linkage structure. The upper side rails of a canopy frame generally comprise a supporting profile, which is formed by at least one hollow profile chamber, and at least one running and guide rail, which is joined to said supporting profile, for supporting, preferably in a longitudinally displaceable manner, bows which carry a folding-top tarpaulin or at least a roof tarpaulin. Separable and removable adjacent length sections of the upper side rails of canopy frames or else of vehicle superstructures of different design are connected to each other in the conventional manner by means of rigid profile material sections which consist of solid material and engage in the hollow profile chambers of two side-rail sections to be coupled together, wherein the most varied means have been used in order to secure the mutual connection of two adjacent length sections of a side rail. Irrespective of the details of how the known means used for securing the coupling of two side-rail sections to be coupled together are obtained, they share the disadvantage of not being designed to engage automatically. Furthermore, the formation of the known coupling elements as solid material sections is associated with the disadvantage of a considerable weight.

SUMMARY OF THE INVENTION

The invention is based on an the object of providing a coupling for the individual length sections, connected releasably to one another, of the upper side rails of canopy frames, which coupling, completely irrespective of the construction of the side rail as a steel profile rail or as an extruded profile, is primarily distinguished by automatic engagement of the securing means and furthermore by having the lowest possible weight and also by being able to be produced and maneuvered in a simple manner.

According to the present invention, the present invention provides a side-rail coupling, where the fitting according to the invention of the coupling elements with bolt elements which automatically engage under spring loading ensures automatic securing of the coupling between two adjacent side-rail sections. Any risk of an accident resulting from possible negligence by the operator is therefore ruled out. Furthermore, the refinement according to the invention of a side-rail coupling has the additional advantage of being able to be separated relatively easily.

In a particularly preferred embodiment of a side-rail coupling it is additionally provided that the coupling elements are formed by length sections of a hollow profile material and are fitted with two bolt elements arranged opposite each other. This firstly ensures a considerable reduction in weight as compared to solid material parts and secondly ensures an additional improvement in the safety of the locking of the coupling elements to the side-rail sections to be coupled together. It is particularly advantageous here that the recesses assigned to the bolt elements are arranged in walls of the hollow profile chambers, which walls form outer circumferential walls of the side-rail profile, and pass through said walls, resulting in the advantage that during the intentional separation of the coupling of two adjacent side-rail sections, the bolt elements, irrespective of the manner of design of the side-rail sections as an extruded profile or as a steel profile, can be disengaged without the assistance of a tool and merely by hand. As a result, this leads to a considerable improvement in the handling of the canopy frame and therefore ultimately to a considerable increase in the quality of use of the canopy.

In one expedient individual refinement, as regards the fitting of the bolt elements and their loading springs into the coupling element, it is provided that two respective bolt elements which are arranged opposite each other are held in a sleeve-like guide aligned transversely to the longitudinal axis of the coupling element and are acted upon by a common compression spring which is arranged between them and is designed as a helical spring.

According to a further expedient individual refinement, as regards the fitting of the bolt elements and their loading springs into the coupling element, it can also be provided that two respective bolt elements which are arranged opposite each other are acted upon with a spring load in opposite directions by means of a common leaf spring, the leaf spring comprising a section bent in the shape of a U of spring steel sheet material and the two free ends of the legs of the leaf spring being supported against each other.

Regardless of the fact that the side-rail coupling according to the invention is eminently suitable for use in conjunction with every occurring form of design of side rails of canopy frames, a particularly preferred application is found by the side rail being composed of length sections of a steel profile, a hollow profile chamber which forms the supporting profile being formed by a region, deformed to form a square profile cross-sectional shape, of a unit comprising the supporting profile and integrally formed running and guide rail having a T-shaped cross-sectional profile, which unit is formed by folding a sheet-metal material or by deformation of a thin-walled hollow profile material.

Irrespective of the design of the side rail whose length sections are to be coupled to one another, it is finally also advantageous that the bolt elements which are arranged lying opposite each other of the coupling part are formed as push buttons which reach through mutually opposite walls of the supporting profile.

BRIEF DESCRIPTION OF THE DRAWINGS

The present invention is described in detail in the following description of examples by reference to two exemplary embodiments which are illustrated in the drawing.

FIG. 2 shows a partial longitudinal section through the region of two adjacent length sections of an upper side rail of the canopy frame according to FIG. 1;

FIG. 3 shows a cross section through a length section of the upper side rail of a canopy frame in the region of its coupling to an adjacent section;

FIG. 4 shows a longitudinal section through a first embodiment of a coupling element, and FIG. 5 shows a longitudinal section through a second embodiment of a coupling element.

DETAILED DESCRIPTION OF A PREFERRED EMBODIMENT

Figure 1:
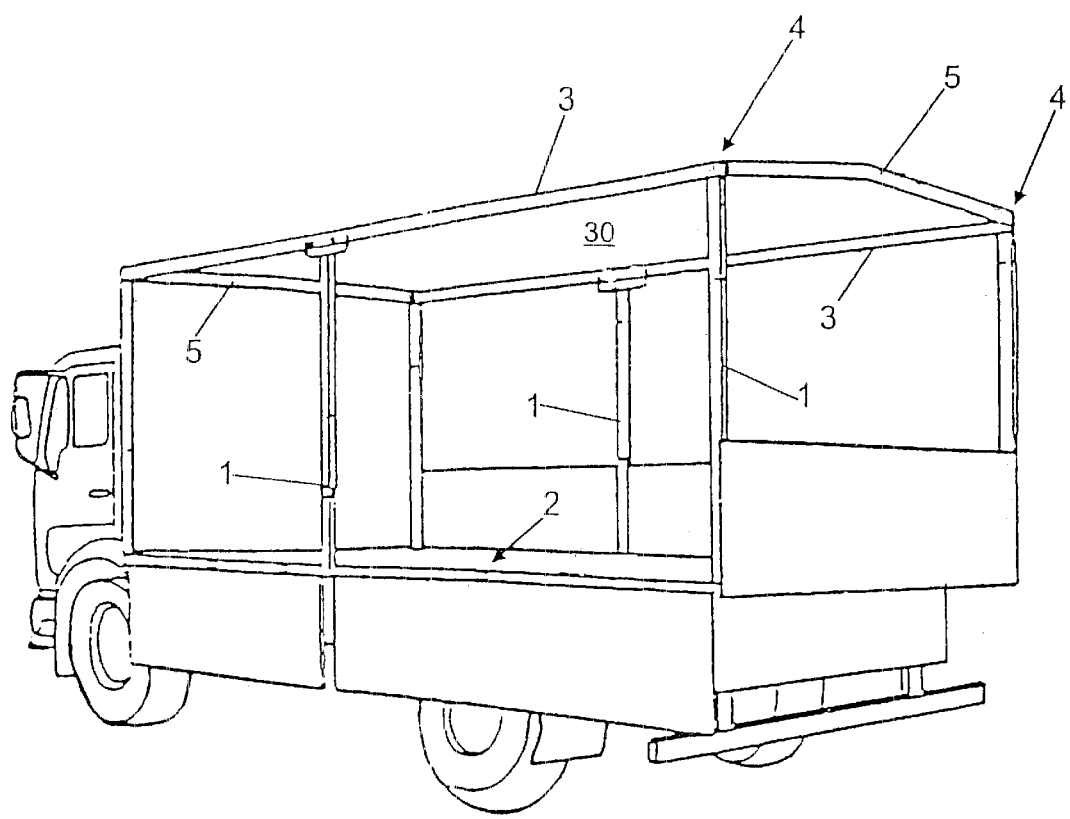
FIG. 1 shows a schematic, graphical illustration of a commercial vehicle fitted with a canopy frame.

A vehicle body which is fitted with a tarpaulin canopy which can be pushed together (not shown in its entirety in the drawing) has a canopy frame which, in its two upper, lateral regions, contains a respective side rail 3 which extends over the length of the canopy and is supported against a loading platform 2 via upwardly protruding supports 1, for the purpose of holding and guiding displaceable bows 5 which are fitted on both ends with roller carriages 4 and, for their part, carry the folding-top tarpaulin 30. In addition, the side rails 3 are supported against the loading platform 2 or the frame thereof over the length of the canopy by means of displaceable stakes 1. In the exemplary embodiment shown in the drawing, the side rails 3 are divided over the length of the vehicle into a number of length sections 3a and 3b which can be connected to one another or can be coupled together. In addition, in the embodiment shown each of the two side rails 3 consists of length sections 3a and 3b of a single-piece profile material, in particular a steel profile, in which a hollow profile chamber 6 which forms the supporting profile is formed by a region, deformed to form a square profile cross-sectional shape, of a unit comprising the supporting profile 6 having apertures 18 and integrally formed running and guide rail 7 having a T-shaped cross-sectional profile, for the rollers of the roller carriages 4, which unit is formed by folding a sheet-metal material or by deformation of a thin-walled hollow profile material.

According to the first refinement (illustrated in FIG. 4) of the fitting of the bolt elements 8 and their loading springs 9 into a section 11, forming a coupling element, of a hollow profile material, two respective bolt elements 8 which are arranged opposite each other are held in a sleeve-like guide 12 aligned transversely to the longitudinal axis of the coupling element 10 and are acted upon by a common compression spring which is arranged between their mutually facing ends 13 and is designed as a helical spring 14. In addition, the two bolt elements 8 are held or guided in a sleeve-like guide 12.

According to the second refinement (illustrated in FIG. 5) of the fitting of the bolt elements 8 and their loading springs 9 into the coupling element 10, two respective bolt elements 8 which are arranged opposite each other are acted upon with a spring load in opposite directions by means of a common leaf spring 16, the leaf spring 16 including a section bent in the shape of a U of spring steel sheet material and the two free ends 17, 18 of the legs 19 and 20, respectively assigned to a bolt element 8, of the leaf spring 16 being supported against each other.

List of Reference Numbers
1 Supports
2 Loading platform
3 Side rail
3a Length section
3b Length section
4 Roller carriage
5 Bow
6 Hollow profile chamber, supporting profile
7 Running and guide rail
8 Bolt elements
9 Loading springs
10 Coupling element
15 11 Section
12 Guide
13 Ends
14 Helical spring, compression spring
16 Leaf spring
17 Free ends of the legs
18 Free ends of the legs
19 Legs of the leaf spring
20 Legs of the leaf spring

What is claimed is:

1. A side-rail coupling for tarpaulin canopies of vehicle superstructures, comprising:

upper side rails of a canopy frame, the side rails having length sections, at least one hollow profile chamber, and complementary apertures arranged in side walls of the hollow profile chamber, said length sections being able to be put together and separated;

running and guide rails, said running and guide rails being connected to said hollow profile chamber;

rollers or roller carriages, said running and guide rails serving for the supporting and guiding of said rollers or rollers carriages;

bows, said bows being supported by said rollers or roller carriages in a displaceable manner against the canopy frame and said bows carrying a roof tarpaulin;

coupling elements, wherein said length sections are connectable releasably to each other by means of said coupling elements engaging in a form-locking manner in said hollow profile chambers of said side rails, said coupling elements being formed by profile material sections having a profile cross-sectional shape which is at least substantially congruent to an inner profile cross section of said hollow profile chamber, said coupling elements including two opposite bolt elements for each of said two length sections to be coupled and a spring, said two opposite bolt elements capable of being adjusted perpendicular to their longitudinal axis and interacting with said complementary apertures, and said spring providing a spring load and commonly acting for said respective two opposite bolt elements.

2. The side-rail coupling as claimed in claim 1 wherein the coupling elements are formed by length sections of a hollow profile material.

3. The side-rail coupling as claimed in claim 1 wherein the side walls form outer circumferential walls of a side-rail profile, the apertures passing through the side walls.

4. The side-rail coupling as claimed in claim 1 wherein the two respective bolt elements arranged opposite each other are held in a sleeve-like guide aligned transversely to a longitudinal axis of the coupling element and wherein the spring is a helical compression spring arranged between the bolt elements.

5. The side-rail coupling as claimed in claim 1 wherein the two respective bolt elements arranged opposite each other are acted upon with a spring load in opposite directions through a common leaf spring, the leaf spring including a section bent in the shape of a U of spring steel sheet material, two free ends of the legs of the leaf spring being supported against each other.

6. The side-rail coupling as claimed in claim 1 wherein the side rail is composed of length sections of a steel profile, the hollow profile chamber which forms a supporting profile being formed by a region, deformed to form a square profile cross-sectional shape, of a unit comprising the supporting profile and integrally formed running and guide rail having a T-shaped cross-sectional profile, which unit is formed by folding a sheet-metal material or by deformation of a thin-walled hollow profile material.

7. The side-rail coupling as claimed in claim 6 wherein the bolt elements arranged lying opposite each other of the coupling part are formed as push buttons which reach through mutually opposite walls of the supporting profile.

* * * * *